United States Patent [19]

Shippen

[11] Patent Number: 5,108,811
[45] Date of Patent: Apr. 28, 1992

[54] REMOVABLE, REUSABLE, ADHEREABLE, WINDOW, INSULATION MATERIAL

[76] Inventor: Mark Shippen, 108 St. Francis Pl., Prattville, Ala. 36067

[21] Appl. No.: 511,072

[22] Filed: Apr. 19, 1990

[51] Int. Cl.⁵ .......................... B32B 3/06; B32B 5/18
[52] U.S. Cl. ........................................ 428/40; 428/77; 428/194; 428/260; 428/317.3; 428/343; 428/355
[58] Field of Search ............... 428/317.3, 40, 77, 99, 428/194, 343, 355, 260

[56] References Cited

U.S. PATENT DOCUMENTS

| | | | |
|---|---|---|---|
| 2,619,168 | 11/1952 | Leverence | 428/40 |
| 2,943,676 | 7/1960 | Grenci | 428/43 |
| 3,913,655 | 10/1975 | Ogino | 428/40 |
| 3,952,133 | 4/1976 | Amos et al. | |
| 4,039,709 | 8/1977 | Newman | 428/40 |
| 4,268,567 | 5/1981 | Harmony | 428/77 |
| 4,539,238 | 9/1985 | Markowitz | 428/43 |
| 4,623,593 | 11/1986 | Baier et al. | |
| 4,735,837 | 8/1988 | Miyasaka | 428/42 |
| 4,811,982 | 3/1989 | Carlyle | 428/194 |
| 4,889,754 | 12/1989 | Vargas | 428/43 |

FOREIGN PATENT DOCUMENTS 2033947 5/1980 United Kingdom .

*Primary Examiner*—Jenna Davis

[57] ABSTRACT

A new adhereable window insulation material is disclosed which will reduce the amount of energy required to heat and cool a building. An advancement in removable, reusable adherent technology is used to adhere thermal insulation material to a smooth surface substrate such as glass. An insulation material such as polyethylene foam can save as much as 46% of the heating load for single glaze glass and 38% for double glaze glass.

13 Claims, No Drawings

REMOVABLE, REUSABLE, ADHEREABLE, WINDOW, INSULATION MATERIAL

BACKGROUND AND SUMMARY OF THE INVENTION

The need to conserve natural resources and energy is essential if man is to survive on Earth. Irreversible damage to the environment is occurring due to the strip mining of coal, sulfure dioxide emissions from utility plants, catastrophic oil spills, nuclear power plant wastes and the "green house effect" of too much carbon dioxide in the atmosphere. This damage must be minimized!

The following paper discloses a way for people all over the planet to conserve energy derived from utility plants. Moreover, the energy saved is that which is most needed for human survival—that is the energy required to maintain a comfortable temperature in homes and other buildings. This invention will allow its users to live more comfortably with less energy demand.

Specifically, this invention provides a way to insulate glass and reduce the amount of energy required to heat and cool the building. In the United States, the architectural trend over the last 120 years has been to increase dramatically the amount of glass in homes. Now, the energy lost through the glass approaches the total energy lost to air changes in the entire building. As the cost of energy continues to rise and the damage to the environment continues to occur, an improved technology for window insulation is needed.

Currently, windows are covered with very loose fitting curtains, drapery or blinds. These function to provide privacy convenient viewing, light regulation and a decorative effect. Little or no insulation value results.

In the past plastic films including vinyl, polyethylene and heat shrink films have been tacked or taped around the window frame. If a good seal is obtained and no edge losses are assumed, (this is seldom the case), a maximum of 1R insulation value may be obtained. Furthermore, reflective films and coatings may be applied to windows to reduce the summer cooling load. Reflective films, however, are permanent and highly undesirable for wintertime applications.

Now, the present invention makes insulation value the priority of window curtain design. To achieve this objective a removable, reusable, adherent holds the curtain material flat against the glass. If a thermal insulation material like polyethylene foam is specified, wintertime energy savings of 46% for single glaze glass and 38% for double glaze glass are projected. Similar results can be expected for summertime applications. Now, flat adhereable curtain technology, FACT for short, can provide the window user with privacy, light regulation, a decorative effect and substantial energy savings.

Another advantage is a flat curtain will be more resistant to fires. In addition, hospitals require sanitary conditions. A flat all plastic curtain will prevent the buildup of dust especially in allergy wards. Less maintenance will be required. A flat adhereable all plastic curtain construction will be much easier to clean.

DESCRIPTION OF THE PRIOR ART

First, it is necessary to standardize the terminology "removable, reusable adherent" so that relevant prior art can be compared to the standard. In the context of this application "removable, reusable adherent" means any adherent material which has one or more of the following eight characteristics:

1) Preferential adherence to glass and other smooth surfaces like aluminum supports in window structures.
2) Reusable adherent for thousands of applications.
3) Washable in soap and water to remove dust or fiber contamination.
4) A relatively constant degree of adherence during long periods of adherence on a smooth surface.
5) Little or no adherence to porous surfaces.
6) Little or no adherence upon contact with its own adherent surface.
7) Won't leave residue on contact surface.
8) May be applied in a wide range of temperatures including 0 degrees C.

When comparing an adherent to this list of characteristics, it should be noted that the preferred removable, reusable adherent embodies all eight characteristics.

Soft plastics including static cling vinyl are known to adhere to glass. United Kingdom patent number 2,033,947 claims that polyvinylchloride with a softener added is "detachably adherent" to the window surfaces of road vehicles. This material, however, will not bond to flat aluminum in a window frame. This adherence problem could cause gaps between the aluminum support members and the glass panes on many windows. Loss of insulation value would occur. Also, loading the plastic film with foam insulation and/or a decorative material may result in loss of adhesion. Cold temperature also adversely affects the application of the plastic.

In addition, thousands of ultraviolet light curable resins are known to have elastomeric properties. These compositions find utility in adhesive applications including pressure sensitive tapes and films. Furthermore, molding a UV curable resin composition between a polyethylene film release liner and a carrier film such as a polyester is known to form a plastic film with the characters of a "detachably adherent" PVC film. These products, however, are limited in application by cold temperatures. Also, oxygen is known to inhibit curing on the surfaces of these compositions. These tacky, cure inhibited, surfaces are easily fouled and may retain dust permanently.

Another reusable adherent is known to be applied repeatedly and detached to human skin or other surfaces. U.S. Pat. No. 4,623,593 discusses this technology. A cyanoacrylate surface inhibitor has found utility in elastomeric polymeric articles. However, these surface inhibited elastomers stick to porous surfaces and bond upon contact with its own adherent. Thus, they would be undesirable for repeated applications to glass.

In addition, water soluble compositions disclosed in United Kingdom patent 2,033,947 are "detachably adherent" to the window surfaces of road vehicles. This material could bond to porous surfaces and would not be washable with soap and water. Additionally, the patent claims polysaccharides could be used to adhere films to glass. This would leave a residue and could attract ants and other insects.

DESCRIPTION OF THE PREFERRED EMBODIMENTS

1) A removable, reusable adherent is required for applications to glass and other smooth surfaces. Theoretically, a removable, reusable adherent can be derived from many adhesive compositions. One method of production involves reducing the active surface area of an adhesive composition. This can be accomplished by molding the adhesive with a release film such as polyethylene film or Kraft release liners. A method description is disclosed in U.S. Pat. No. 4,929,401. Specifically, these organopolysiloxane adhesive compositions are known to cure by heat or in ambient conditions by catalytic polymerization, loss of small amounts of solvent and ultraviolet irradiation. From this class of compositions a preferred composition is given as the following example:

EXAMPLE I

Roughen with sandpaper one side of a small sheet of 0.3175 cm thick polyethylene foam. Mix 30% by weight of a 350 cs. viscosity dimethylpolysiloxane available from Dow Corning (USA) and 70% by weight of a room temperature vulcanizing silicone sealant such as RTV-108 available from General Electric (USA). Using a ruler edge apply a thin coating approximately 0.015 cm thick on the chaffed surface of the polyethylene foam. Overlay a 0.01 cm thick polyethylene film on the wet surface. Then, use your hand to apply pressure to film mold the adherent. Allow the adherent to cure for approximately 24 hours. Then the polyethylene molding film can be peeled away to expose the adherent. Note how well the adherent sticks to glass. Also, note that adherent doesn't appear to trap bubbles between the glass and the adherent.

Obviously, many other organopolysiloxane compositions could be formulated or processed to achieve the specified adherent surface. In addition, many other adhesive compositions could be film molded to achieve a removable, reusable adherent. Also, the objective of reducing the active surface area of the adhesive composition could be accomplished with inhibiting agents, inert filling or the like. Given the application surface, the adherent specification, and the preferred example, those knowledgeable in the art of adhesive formulation and processing could cite more examples of a removable, reusable adherent surfaces. Therefore, the above example should be considered illustrative and not restrictive of the adherents which can be formulated or processed to embody all eight of the preferred characteristics of the desired removable, reusuable adherent.

2) The second embodiment requires a thermal insulation material. Thermal insulation fabric, insulating foams including polyethylene foam may be used. Although roll formed thermal insulation material is preferred for mass production, any material which provides the desirable insulation or light transmission characteristics can be used. The polyethylene foam cited has a R value of approximately 2.75. Also, it allows radiated energy to pass through the foam. It is very inexpensive. During the winter this material can function like a check valve allowing the windows to gain radiated energy on the sunny sides, and then, trap the energy within the building.

Naturally, the insulation material can be decorated to improve the overall appearance. Textile material, plastic films or paper products may be attached to the insulation material. Regular pressure sensitive adhesives, lamination, or removable, reusable adherents may be used. In addition, a polyamide fusible interlacing material may be coated with the removable, reusable adherent described in embodiment #1. This will allow users to iron a strip of polyamide coated reusable adherent to a wide variety of textile fabrics and make a seamless decorative material to compliment the insulation. The insulation substrate, however, must have a smooth surface for effective reusable adhesion. To achieve this the foam can be laminated with a plastic film like Mylar or other plastic materials.

Also, additives known to be used in adhesives, UV curable resins, or plastics can enhance the character of flat adhereable curtain technology. Inhibitors, surfactants, dyes, pigments, ultraviolet absorbers, fillers, reflectants, softeners, plasticizers, reactive diluents, non-reactive diluents, antistatic treatments, anti-fungicidal agents, and aromatic scents are all examples of such additives.

OTHER APPLICATIONS

This state-of-the-art reusable adherent insulation material, undoubtedly, will find other uses. The improved adherence and cold temperature elasticity will make it desirable for use on the curved glass of a road vehicle. The insulating properties will make an effective sun blocker to apply to the interior glass of parked road vehicles to reduce the effects of summer heat. Also, the material described herein would insulate a cold beverage can or the like. An aromatic scent adherent would make an excellent diffusion media for an air freshener.

Finally, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

I claim:

1. A removable, reusable window insulation article designed for interior application to residential and industrial window for the purpose of achieving a substantial reduction in heating and cooling load with savings up to 46% for single glaze glass and 38% for double pane glass, where said insulation article comprising:
   1) A removable, reusable, washable adherent material, and
   2) A thermal insulation material selected from the group consisting of insulating fabrics and polyethylene foam.

2. The window covering of claim 1 where the adherent material is a plastic.

3. The window covering of claim 1 where the adherent is derived from an adhesive composition.

4. The window covering of claim 1 where the adherent is derived from a film molded adhesive composition.

5. The window covering of claim 1 where the adherent material is an organopolysiloxane composition.

6. The window covering of claim 1 where the adherent material is derived from a film molded organopolysiloxane composition.

7. The window covering of claim 1 where the adherent material is derived from an ultraviolet light curable resin composition.

8. The window covering of claim 1 where the adherent material is derived from a film molded ultraviolet light curable resin composition.

9. The window covering of claim 1 where the insulation material is a polyethylene foam.

10. The window insulation material at claim 1 where one or more decorative materials selected from the group consisting of plastic films, paper and textile fabric is attached or affixed to the thermal insulation material.

11. The window covering of claim 1 wherein an adherent coated heat fusible interlacing is used to attach a decorative material to the insulation material.

12. The window covering of claim 1 where the adherent material is a film molded, room temperature vulcanizing, silicone sealant composition blended with a diluent.

13. The smooth surface covering of claim 1 where the adherent material comprises a film molded room temperature vulcanizing, silicone sealant composition blended with a dimethylpolysiloxane diluent.

* * * * *